US006215090B1

(12) United States Patent
Severance, Jr. et al.

(10) Patent No.: US 6,215,090 B1
(45) Date of Patent: Apr. 10, 2001

(54) PLASMA ARC TORCH

(75) Inventors: Wayne Stanley Severance, Jr., Darlington, SC (US); Jeffrey Stuart Everett, Winston-Salem, NC (US)

(73) Assignee: The ESAB Group, Inc., Florence, SC (US)

( * ) Notice: Subject to any disclaimer, the term of this patent is extended or adjusted under 35 U.S.C. 154(b) by 0 days.

(21) Appl. No.: 09/181,241

(22) Filed: Oct. 28, 1998

Related U.S. Application Data

(60) Provisional application No. 60/077,087, filed on Mar. 6, 1998.

(51) Int. Cl.[7] .......... B23K 9/00

(52) U.S. Cl. .......... 219/121.48; 219/121.52

(58) Field of Search .......... 219/121.48, 121.5, 219/121.52, 121.49, 121.51, 121.36, 121.43, 74; 118/723 DC; 439/195; 431/354; 356/316

(56) References Cited

U.S. PATENT DOCUMENTS

| | | | | |
|---|---|---|---|---|
| 3,195,095 | * | 7/1965 | Field | 439/195 |
| 4,049,943 | * | 9/1977 | Pratt | 219/74 |
| 5,069,546 | * | 12/1991 | Liang et al. | 356/316 |
| 5,097,111 | * | 3/1992 | Severance, Jr. | 219/121.52 |
| 5,186,621 | * | 2/1993 | Pennington | 431/354 |
| 5,328,516 | * | 7/1994 | Dietiker | 118/723 DC |
| 5,396,043 | * | 3/1995 | Couch, Jr. et al. | 219/121.5 |
| 5,747,767 | * | 5/1998 | Severance et al. | 219/121.5 |
| 5,874,707 | * | 2/1999 | Iida et al. | 219/121.48 |
| 5,965,039 | * | 10/1999 | Kitahashi et al. | 219/121.5 |

* cited by examiner

*Primary Examiner*—Teresa Walberg
*Assistant Examiner*—Quang Van
(74) *Attorney, Agent, or Firm*—Alston & Bird LLP

(57) ABSTRACT

A plasma arc torch with improved sealing of connections between fluid passages of adjoining parts of the torch includes a main torch body and an insulator body which abut and each of which has a plasma gas passage and a control fluid passage which extend to the abutting end faces of the bodies and are aligned thereat. Connections between the aligned plasma gas passages are made via coupling tubes each having a first portion inserted into a receiving portion of the passage in the main torch body and a second portion inserted into a receiving portion of the passage in the insulator body. Each inserted portion includes a pair of O-rings spaced apart along the length of the tube for sealing the connection. An elongate insulating conduit is sealingly received within the control fluid passages of the insulator body and main torch body, and extends through the main torch body into a control fluid connector tube. A pilot arc electrical assembly includes an electrical connector attached to an end of a pilot arc bus wire and received in a receptacle in the insulator body, and a contact screw which extends through a contact ring at the outer end of the insulator body into the receptacle and engaging the connector.

35 Claims, 6 Drawing Sheets

PLASMA ARC TORCH

CROSS-REFERENCE TO RELATED APPLICATION

This application claims priority to U.S. Provisional Patent Application Ser. No. 60/077,087 entitled "Plasma Arc Torch", filed Mar. 6, 1998.

FIELD OF THE INVENTION

The present invention relates to plasma arc torches.

BACKGROUND OF THE INVENTION

Plasma arc torches are commonly used for the working of metals, including cutting, welding, surface treating, melting, and annealing. Such torches include an electrode which supports an electric arc that extends from the electrode to a workpiece. A plasma gas such as an oxidizing gas is typically directed to impinge on the workpiece with the gas surrounding the arc in a swirling fashion. In some types of torches, a second shielding gas is used to surround the jet of plasma gas and the arc for controlling the work operation. In other types of torches, a swirling jet of water is used to surround the jet of plasma gas and the arc and impinge on the workpiece for controlling the work operation.

One characteristic of existing plasma arc torches is that there is little or no commonality between shielding gas torches and water-injection torches. Thus, a user who desires to employ both gas-shielded and water-injected plasma arc processes must purchase two complete torch assemblies. Furthermore, a plasma arc torch manufacturer who desires to make both types of torches must manufacture and maintain inventories of two complete sets of different components, and therefore the cost complexity of the manufacturing operation are increased.

In a typical plasma arc torch, the plasma gas and the shielding gas or water are directed by a nozzle assembly having a plasma gas nozzle and a shielding gas or water injection nozzle coaxially arranged concentrically or in series. The nozzle assembly is electrically conductive and is insulated from the electrode so that an electrical potential difference can be established between the electrode and the nozzle assembly for starting the torch. To start the torch, one side of an electrical potential source, typically the cathode side, is connected to the electrode and the other side, typically the anode side, is connected to the nozzle assembly through a switch and a resistor. The anode side is also connected in parallel to the workpiece with no resistor interposed therebetween. A high voltage and high frequency are imposed across the electrode and nozzle assembly, causing an electric arc to be established across a gap therebetween adjacent the plasma gas nozzle discharge. This arc, commonly referred to as a pilot or starting arc, is at a high frequency and high voltage but a relatively low current to avoid damaging the torch. Plasma gas is caused to flow through the plasma gas nozzle to blow the pilot arc outward through the nozzle discharge until the arc attaches to the workpiece. The switch connecting the potential source to the nozzle assembly is then opened, and the torch is in the transferred arc mode for performing a work operation on the workpiece. The power supplied to the torch is increased in the transferred arc mode to create a cutting arc which is of a higher current (and typically a lower voltage) than the pilot arc.

Because of the relatively high voltages and currents used in such torches, the electrode and nozzle assembly become hot and must be cooled to prevent early failure of the torch. Accordingly, high-current plasma arc torches generally include coolant circuits for flowing a coolant around the nozzle assembly and/or the electrode. The liquid coolants used often are capable of conducting electricity to some extent. In water-injection torches, unless deionized water is used for the injection water, the injection water is also capable of conducting electricity to some extent. In addition, some shielding gases are conductive, such as argon.

One of the problems with some existing plasma arc torches is current leakage between the electrode potential and the nozzle potential caused by injection water, shielding gases, and/or coolant flowing between adjoining surfaces of various parts of the torches and making its way from a part at electrode potential to a part at nozzle potential. When this happens, a larger voltage potential must be imposed across the electrode and nozzle assembly in order to establish the starting arc. If the current leakage is severe enough, starting the torch can be difficult or nearly impossible with reasonably manageable levels of voltage.

Another problem with some existing torches is that the shield gas or injection water typically flows through a component of the torch which is at electrode potential and then comes into contact with a component of the torch at nozzle potential over a path of relatively short length. Depending on the shielding gas or the type of injection water used, it is possible for current to leak via this path through the shielding gas or injection water. Thus, even if adequate precautions are taken to seal connections between parts to prevent wetting of adjoining component surfaces, there is still a potential leakage path which can make starting the torch difficult.

A further disadvantage of some existing torches is that the electrical conductor wire which is connected to the nozzle assembly is routed internally through the torch and is secured by a set screw in a hole in a contact ring with which the nozzle assembly makes contact when the torch is assembled. The contact ring must frequently be removed and replaced to enable replacement of certain parts that wear out. When replacing the contact ring, it can be difficult to engage the end of the conductor wire in the hole in the contact ring, especially if the end of the wire is frayed or bent. Moreover, the wire can become pushed back into the torch if there is interference between the contact ring hole and the wire.

In summary, existing plasma arc torches are subject to several disadvantages, namely, lack of commonality between gas-shielded and water-injection torches, current leakage through various leakage paths, and difficulty making an electrical connection between the nozzle and the conductor leading to the power supply when assembling the torch.

SUMMARY OF THE INVENTION

The present invention enables commonality between gas-shielded and water-injection torches so that a user or manufacturer can assemble either type of torch by starting with a common torch body. Accordingly, the user who performs both gas-shielded and water-injection processes is afforded greater flexibility in adapting a plasma arc torch system to the needs of a particular process, and can perform both types of processes with a smaller total capital investment in equipment. Furthermore, a manufacturer of both gas-shielded and water-injection torches potentially can achieve greater manufacturing efficiencies on the parts in common between the two types of torches.

To these ends, the invention in accordance with a first embodiment thereof provides a plasma arc torch assembly which includes a main torch body having first and second end faces, and a control fluid passage and a plasma gas passage each extending from the first end face through the main torch body and out the second end face. The control fluid passage is adapted to carry either a shielding gas or injection water. The torch assembly further comprises one of a shielding gas insulator body and a water-injection insulator body. The shielding gas insulator body has opposite first and second ends and a shielding gas passage and a plasma gas passage each extending from the first end through the insulator body, the first end of the insulator body being structured to be received against the second end of the main torch body, and the shielding gas and plasma gas passages being alignable with the control fluid and plasma gas passages, respectively, of the main torch body. Similarly, the water-injection insulator body has opposite first and second ends and an injection water passage and a plasma gas passage each extending from the first end through the water-injection insulator body, the first end of the water-injection insulator body also being structured to be received against the second end of the main torch body, and the injection water and plasma gas passages being alignable with the control fluid and plasma gas passages, respectively, of the main torch body.

The torch assembly also includes a nozzle adapted to be juxtaposed with the second end of either of the insulator bodies for receiving plasma gas from the plasma gas passage thereof, and an electrode having a discharge end adapted to be juxtaposed with the nozzle and to support an electric arc extending therefrom through the nozzle to a workpiece.

The main torch body is assemblable with either the shielding gas insulator body or the water-injection insulator body such that plasma gas is passed from the main torch body through the insulator body and to the nozzle and one of the shielding gas and water is passed through the respective insulator body to surround the arc. The torch assembly of the invention thus enables a user to assemble either a gas-shielded torch or a water-injection torch by starting with a common main torch body.

The invention also overcomes the other disadvantages of existing torches noted above by providing a plasma arc torch having novel sealing connections between the fluid passages of adjoining parts of the torch such that wetting of adjoining surfaces is substantially reduced. In another aspect of the invention, a plasma arc torch is provided having a novel connection for supplying shielding gas or injection water to the nozzle assembly of the torch such that the electrical path through the shielding gas or injection water is substantially lengthened relative to existing torches, thus substantially reducing the likelihood of significant current leakage during starting. In yet another aspect of the invention, a plasma arc torch is provided having a novel electrical connector assembly for connecting the electrical conductor wire to a contact member of the torch such that the wire is held in a position permitting the contact member to be connected with the wire.

To these ends, a plasma arc torch in accordance with a further preferred embodiment of the invention comprises a main torch body having a fluid passage extending through the body and through an end face of the body for passing a fluid such as plasma gas, shielding gas, or injection water to an electrode and/or nozzle assembly of the torch. An insulator body is connected to the main torch body with an end face of the insulator body confronting the end face of the main torch body. The insulator body includes a fluid passage which extends therethrough and through the end face of the insulator body in alignment with the fluid passage of the main torch body. A connector assembly fluidly couples the fluid passages and preferably comprises a coupling tube having a first portion sealingly received within the fluid passage of the main torch body and a second portion sealingly received within the fluid passage of the insulator body.

Preferably, the coupling tube includes resilient compressible seals encircling the first and second portions of the coupling tube. The seals are compressed between the tube and the inner surfaces of the fluid passages to prevent fluid from flowing between the tube and the inner surfaces of the passages. In a particularly preferred embodiment of the invention, each seal comprises an O-ring, and more preferably a pair of O-rings spaced apart lengthwise along the coupling tube, the space between the O-rings establishing an insulating air space.

The connector assembly thus substantially reduces the likelihood of fluid making its way between the confronting end faces of the main torch body and insulator body and establishing an electrical path from the main torch body to another part of the torch at nozzle potential. Furthermore, when the torch is disassembled and the insulator body is disconnected from the main torch body, the connector assembly reduces the likelihood that residual fluid residing in the adjoining fluid passages will come in contact with the adjoining end faces or other surfaces of the bodies. Potential current leakage paths are thus reduced significantly.

In accordance with another aspect of the invention, a plasma arc torch includes an electrically conductive main torch body which has a control fluid passage extending through the body to an end face at an end of the body. The control fluid passage is for supplying a control fluid such as shielding gas or injection water to the torch. The connector tube advantageously is adapted to be connected to a control fluid supply hose with a coupling. A torch end assembly is connected to the main torch body and includes an insulator body having a control fluid passage which extends through an end face which confronts the end face of the main torch body for receiving control fluid from the main torch body. The torch end assembly also includes a nozzle assembly having a control fluid nozzle which receives control fluid from the passages of the main torch body and insulator body.

In order to lengthen the electrical path from the main torch body through the control fluid to the torch end assembly, an elongate electrically insulating conduit is disposed in the control fluid passage of the insulator body and extends through the control fluid passage of the main torch body. The insulating conduit has a first portion that forms a seal with the passage of the insulator body and a second portion that forms a seal with the passage of the main torch body in order to prevent control fluid from establishing an electrical path between the conduit and the control fluid passages of the main torch and insulator bodies. Thus, the electrical path from the main torch body to the torch end assembly extends from the end of the insulating conduit through the control fluid passages of the main torch and insulator bodies. The total resistivity of the path is thereby increased substantially, making current leakage less likely during starting of the torch.

The insulating conduit preferably is sealed by resilient compressible seals which are compressed between the conduit and the inner surfaces of the control fluid passages. The seals preferably comprise O-rings retained in grooves formed in the outer surface of the conduit. More preferably, each seal comprises a pair of O-rings spaced apart along the length of the conduit and retained in a pair of spaced-apart grooves in the conduit. An insulating air space is established between the two O-rings of each seal.

In addition to lengthening the electrical path through the control fluid, the insulating conduit also improves the sealing of the fluid connection between the passages of the main torch body and insulator body so that wetting of adjoining surfaces is less likely when injection water is the control fluid. Thus, the insulating conduit also provides advantages similar to those of the connector assembly described above.

An insulator body in accordance with the invention comprises a solid body of electrically insulating material. The body has first and second opposite end faces, and an axial bore extending through the body from one end face to the other for receiving an electrode assembly of a torch. The insulator body has at least one fluid passage which originates at the first end face and extends through the insulator body for supplying a fluid to other components of a torch, such as a nozzle assembly. The fluid passage includes a receiving portion which originates at the first end face and is adapted to receive a fluid connector such as a coupling tube as described above. The receiving portion is generally cylindrical and includes a tapered or flared entrance portion adjacent the first end face of the insulator body to facilitate inserting a coupling tube into the receiving portion. The receiving portion preferably includes inner surfaces that define a stop for a fluid connector to abut when inserted into the receiving portion. The insulator body preferably includes a plurality of such fluid passages including a plasma gas passage and a control fluid passage, each passage having a receiving portion as described above.

The insulator body also includes a coolant supply passage extending from a first portion of the axial bore through the outer cylindrical surface of the insulator body for supplying a coolant to a plenum surrounding a nozzle assembly of a torch, and a coolant return passage extending from the outer cylindrical surface of the insulator body into a second portion of the axial bore between the first portion and the first end face of the insulator body for returning coolant through the axial bore to a coolant return passage of a main torch body.

In accordance with a further aspect of the invention, a plasma arc torch is provided having an improved means for connecting a conductor wire within the torch. The torch comprises a main torch body having a conductor passage extending through it and an electrical conductor disposed within the conductor passage with a free end of the conductor projecting from an outer end of the main torch body. An insulator body connects to the main torch body and includes a conductor receptacle for receiving the free end of the conductor. An access hole extends from an outer end of the insulator body into the receptacle. The free end of the conductor has an electrical connector assembly attached thereto, and the electrical connector assembly is received within the receptacle in the insulator body. An electrical contact member abuts the outer end of the insulator body, and is adapted to be contacted by a nozzle assembly of the torch. A fastener extends through the contact member and access hole and engages the electrical connector assembly for establishing electrical contact between the electrical connector assembly and the contact member. Thus, an electrical path extends through the conductor and electrical connector assembly to the contact member and thence to the nozzle assembly, which path is used during starting the torch to establish an arc between an electrode of the torch and the nozzle assembly.

To keep the electrical connector assembly from being pushed into the main torch body when assembling the insulator body and contact member onto the torch, an insulating sleeve surrounds the conductor and extends through the conductor passage of the main torch body and into the receptacle of the insulator body. The free end of the conductor extends out from the sleeve. The electrical connector assembly includes an electrical connector attached to the free end of the conductor and larger than the inner diameter of the sleeve, so that the electrical connector is prevented from being pushed into the sleeve. A collar is slidingly received over an end portion of the sleeve which projects out from the conductor passage of the main torch body, the collar being larger in diameter than the conductor passage, and a stop ring is affixed to the sleeve between the collar and the resilient compressible seal, the stop ring abutting the collar to prevent the seal from being withdrawn into the sleeve.

The electrical connector is thus held in a position projecting out from the main torch body so that the insulator body can be assembled to the main torch body and the contact member can be assembled to the insulator body without pushing the conductor into the torch.

The electrical connector preferably comprises a generally cylindrical connector having an axial hole therethrough for receiving the end of the conductor in one end of the hole. The other end of the connector is split. The fastener which secures the contact member to the insulator body includes an end portion that extends into the hole at the split end of the connector and spreads the split end apart.

The electrical connector preferably fits snugly into the receptacle in the insulator body so that the spreading apart of the split end of the connector is resisted by the inner walls of the receptacle, thus facilitating a good electrical connection between the connector and the fastener. To this end, the connector preferably includes a resilient compressible seal encircling the connector and adapted to be compressed between the connector and the inner surface of the receptacle. The seal preferably comprises a pair of O-rings spaced apart along the connector and retained in grooves in the connector.

The sleeve preferably includes a resilient compressible seal encircling the sleeve and adapted to be compressed between the sleeve and the inner surface of the receptacle in the insulator body for preventing liquid from establishing an electrical path from the main torch body through the receptacle and to the electrical connector. The seal preferably comprises a pair of O-rings spaced apart along the sleeve and retained in grooves in the sleeve.

A still further aspect of the invention provides a unique nozzle retaining cup assembly for retaining a nozzle assembly in a gas-shielded plasma arc torch, having a holder and a separately formed cup which is received and secured within the holder, wherein a shielding gas flow path is provided between the outer surface of the cup and the inner surface of the holder for supplying shielding gas to a shielding gas nozzle of the torch.

Additionally, the invention provides a unique electrode holder assembly including a tubular electrode holder and a coolant tube secured within the internal passage of the electrode holder, wherein the electrode holder includes a portion adapted to be received within a bore of an insulator body. The portion includes one or more holes through the side wall of the electrode holder for supplying coolant from the internal passage to a coolant supply passage in the insulator body. A seal adapted to seal against the inner wall of the bore in the insulator body is on the outer surface of the electrode holder located between the holes and the free end of the holder which is adapted to retain an electrode adjacent a nozzle assembly of a torch. A raised rib or dam on the outer surface of the holder is located on the opposite side of the holes from the seal and is adapted to cooperate with the inner wall of the bore in the insulator body to substantially prevent coolant flow past the dam. Coolant which has already cooled the nozzle assembly is returned through a coolant return passage in the insulator body into the bore at a location on the opposite side of the dam from the holes in the electrode holder. The dam discourages flow past the dam in the direction of the holes, so that returned coolant is routed through the bore for return to a coolant source outside the torch.

The invention in its various aspects thus provides a plasma arc torch having a number of significant advantages over prior torches, including the ability to readily convert a gas-shielded torch into a water-injection torch and vice versa, using one common torch body. The invention also promotes improved sealing of fluid connections within the torch so that potential current leakage paths are substantially reduced, and also provides a torch having features for lengthening the potential electrical path through a shielding gas or injection water flow path. The invention thus achieves the objective of reducing current leakage during starting, facilitating the starting of a torch more reliably and with lower voltage. The invention also provides a torch having an improved electrical connection means for establishing connection between an electrical potential source and a contact member of the torch, so that assembly of the torch is facilitated.

BRIEF DESCRIPTION OF THE DRAWINGS

The foregoing and other objects, features, and advantages of the invention will become apparent from the following description of certain preferred embodiments of the invention, when taken in conjunction with the accompanying drawings in which.

DETAILED DESCRIPTION OF THE DRAWINGS

Figure 1:
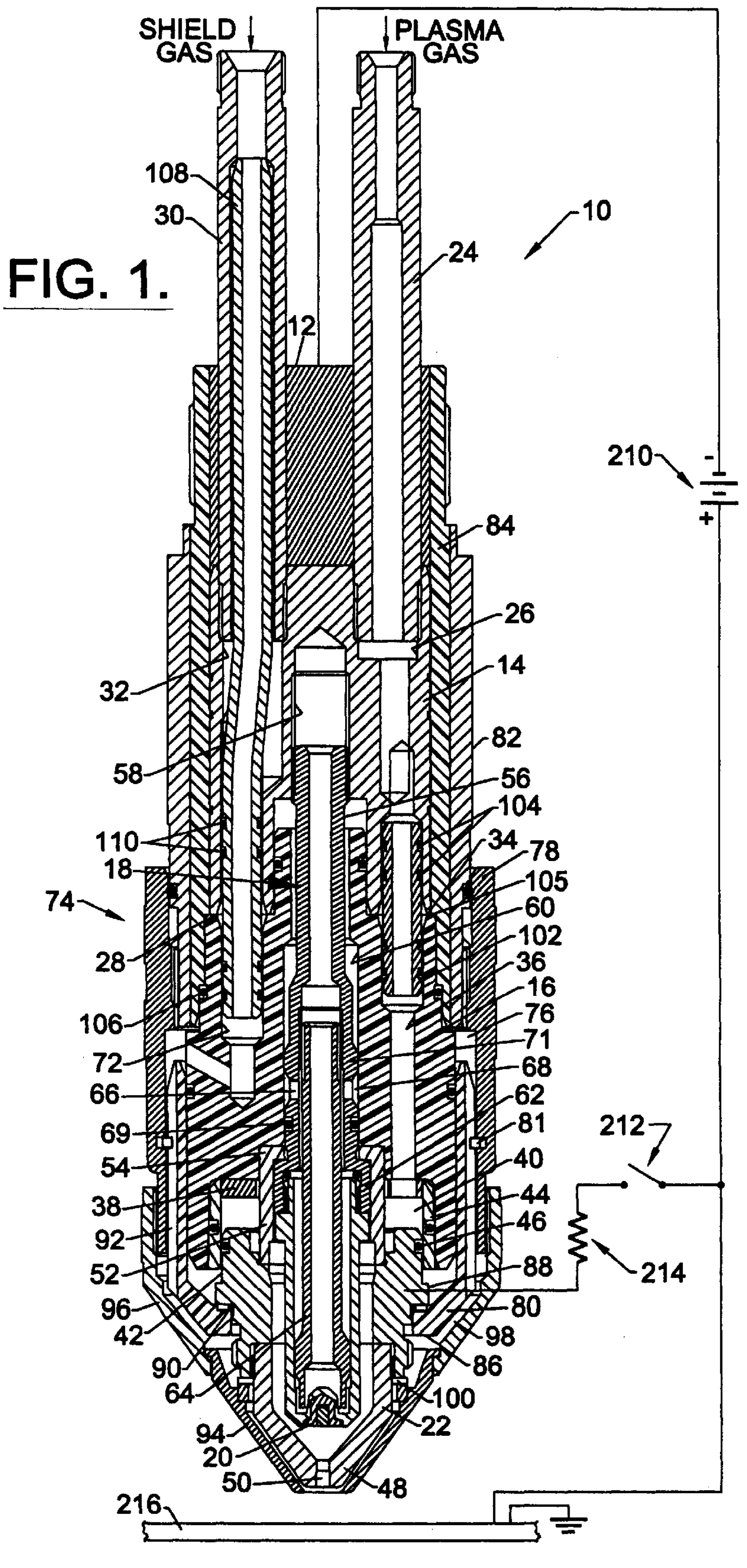
FIG. 1 is a sectioned side-elevational view of a shielding gas plasma arc torch in accordance with a preferred embodiment of the invention.
Figure 1A:
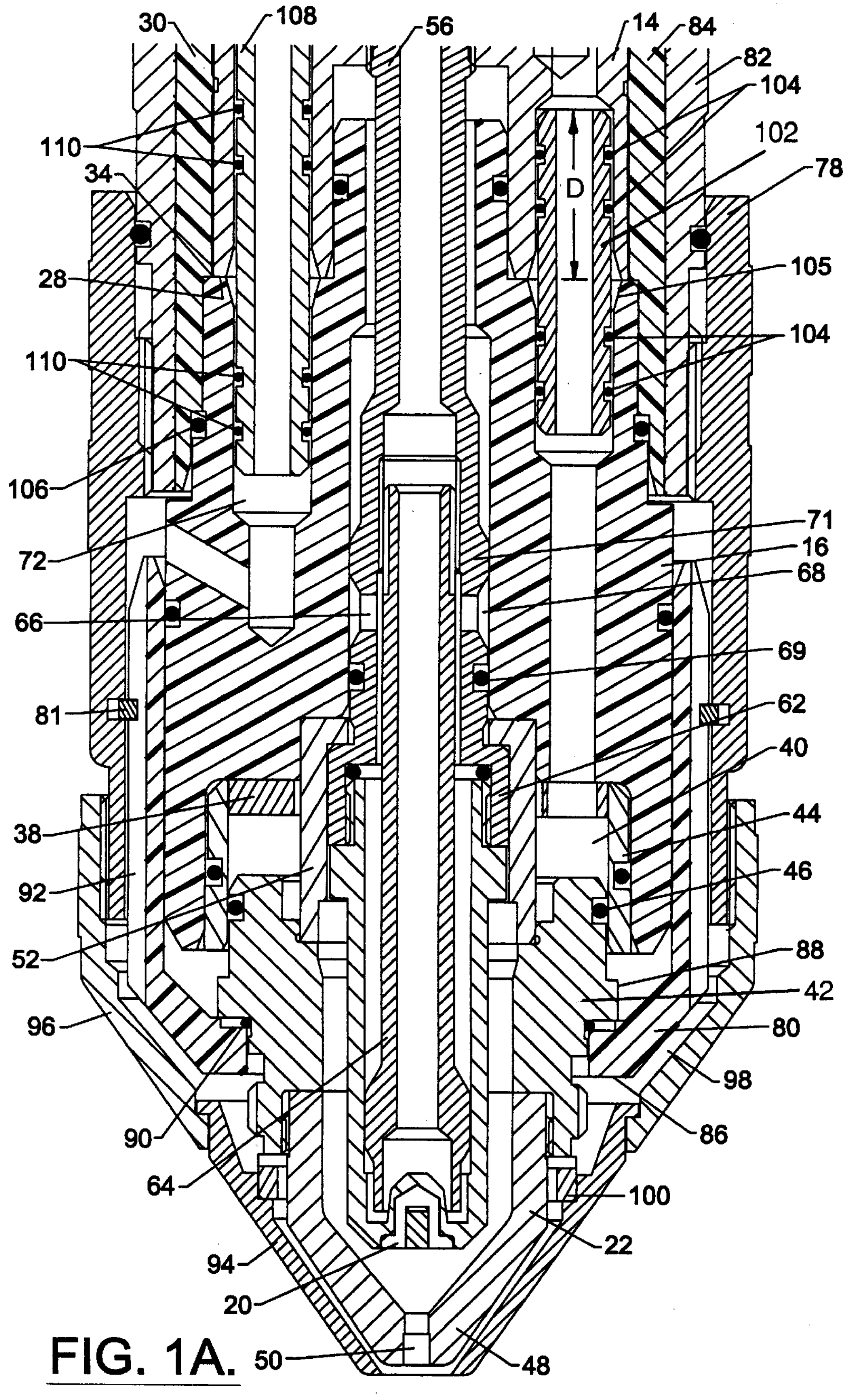
FIG. 1A is an enlarged view showing the lower portion of the torch of FIG. 1.
Figure 2:
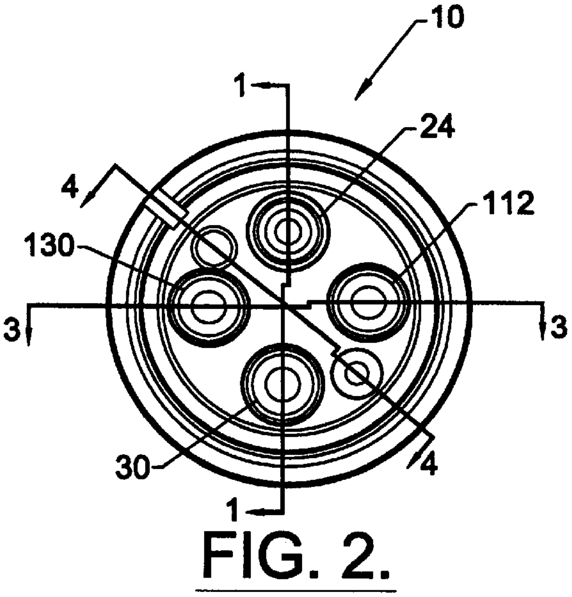
FIG. 2 is an end elevational view of the torch of FIG. 1.

The invention is now explained by describing certain preferred embodiments of the invention, it being understood that the invention is not limited to these specific embodiments.

With reference to FIGS. 1–5, a first preferred embodiment of a plasma arc torch in accordance with the principles of the invention is broadly indicated by reference numeral 10. The torch 10 is a shielding gas torch which provides a swirling curtain or jet of shielding gas surrounding the electric arc during a working mode of operation of the torch. The torch 10 includes a generally cylindrical upper or rear insulator body 12 which may be formed of a potting compound or the like, a generally cylindrical main torch body 14 connected to the rear insulator body 12 and generally made of a conductive material such as metal, a generally cylindrical lower or front insulator body 16 connected to the main torch body 14, an electrode assembly 18 extending through the main torch body 14 and front insulator body 16 and supporting an electrode 20 at a free end of the electrode assembly, and a nozzle assembly 22 connected to the insulator body 16 adjacent the electrode 20.

A plasma gas connector tube 24 extends through the rear insulator body 12 and is connected by screw threads into a plasma gas passage 26 of the main torch body 14. The plasma gas passage 26 extends through the main torch body 14 to a lower end face 28 thereof for supplying a plasma gas (sometimes referred to as a cutting gas), such as oxygen, air, nitrogen, or argon, to a corresponding passage in the insulator body 16, as further described below.

A shielding gas connector tube 30 extends through the rear insulator body 12 and is connected by screw threads into a shielding gas passage 32 of the main torch body 14. The shielding gas passage 32 extends through the main torch body 14 to the lower end face 28 for supplying a shielding gas, such as argon, to a corresponding passage in the insulator body 16.

The insulator body 16 has an upper end face 34 which abuts the lower end face 28 of the main torch body. A plasma gas passage 36 extends through the insulator body 16 from the upper end face 34 into a cylindrical counterbore 38 in the lower end of the insulator body 16. As further described below, the counterbore 38, together with the upper end of the nozzle assembly 22, forms a plasma gas chamber 40 from which plasma gas is supplied to a primary or plasma gas nozzle of the torch. Plasma gas from a suitable source enters the plasma gas chamber 40 by flowing through the plasma gas connector tube 24, through the plasma gas passage 26 in the main torch body 14, into the plasma gas passage 36 of the insulator body 16 which is aligned with the passage 26, and into the chamber 40.

The nozzle assembly 22 includes an upper nozzle member 42 which has a generally cylindrical upper portion slidingly received within a metal insert sleeve 44 which is inserted into the counterbore 38 of the insulator body 16. An O-ring 46 seals the sliding interconnection between the upper nozzle member 42 and the metal insert sleeve 44. A lower nozzle tip 48 of generally frustoconical form is threaded into the upper nozzle member 42 and includes a nozzle exit orifice 50 at the tip end thereof. A plasma gas flow path thus exists from the plasma gas chamber 40 through the upper nozzle member 42 and through the nozzle tip 48 for directing a jet of plasma gas out the nozzle exit orifice 50 to aid in performing a work operation on a workpiece.

The plasma gas jet preferably has a swirl component created, in known manner, by a hollow cylindrical ceramic gas baffle 52 partially disposed in a counterbore recess 54 of the insulator body 16. A lower end of the baffle 52 abuts an annular flange face of the upper nozzle member 42, and an annular space is formed between the baffle 52 and the inner surface of the upper nozzle member 42. The baffle 52 has non-radial holes (not shown) for directing plasma gas from the chamber 40 into the central passageway of the upper nozzle member 42 with a swirl component of velocity.

The electrode assembly 18 includes an upper tubular electrode holder 56 which has its upper end connected by screw threads within a blind axial bore 58 in the main torch body 14. The upper electrode holder 56 extends into an axial bore 60 formed through the insulator body 16, and the lower end of the electrode holder 56 includes an enlarged internally screw-threaded coupler 62 which has an outer diameter slightly smaller than the inner diameter of the ceramic gas baffle 52 which is sleeved over the outside of the coupler 62. The electrode holder also includes internal screw threads spaced above the coupler 62 for threadingly receiving a lower tube 64 which supplies coolant to the electrode 20, as further described below, and which extends outward from the axial bore of the insulator body 16 into the central passage of the nozzle tip 48. The electrode 20 may be of the type described in U.S. Pat. No. 5,097,111, assigned to the assignee of the present application, and incorporated herein by reference. The electrode 20 comprises a cup-shaped body whose open upper end is threaded by screw threads into the coupler 62 at the lower end of the electrode holder 56, and whose capped lower end is closely adjacent the lower end of the lower coolant tube 64. A coolant circulating space exists between the inner wall of the electrode 20 and the outer wall of the coolant tube 64, and between the outer wall of the coolant tube 64 and the inner wall of the electrode holder 56. The electrode holder 56 includes a plurality of holes 66 for supplying coolant from the space within the electrode holder to a space 68 between the electrode holder and the inner wall of the axial bore 60 in the insulator body 16. A seal 69 located between the holes 66 and the coupler 62 seals against the inner wall of the bore 60 to prevent coolant in the space 68 from flowing past the seal 69 toward the coupler 62. A raised annular rib or dam 71 on the outer surface of the electrode holder 56 is located on the other side of the holes 66 from the seal 69, for reasons which will be made apparent below. A coolant supply passage 70 (FIG. 3) extends through the insulator body from the space 68 through the outer cylindrical surface of the insulator body 16 for supplying coolant to the nozzle assembly 22, as further described below.

During starting of the torch 10, a difference in electrical voltage potential is established between the electrode 20 and the nozzle tip 48 so that an electric arc forms across the gap therebetween. Plasma gas is then flowed through the nozzle assembly 22 and the electric arc is blown outward from the nozzle orifice 50 until it attaches to a workpiece, at which point the nozzle assembly 22 is disconnected from the electric source so that the arc exists between the electrode 20 and the workpiece. The torch is then in a working mode of operation.

For controlling the work operation being performed, it is known to use a control fluid such as a shielding gas to surround the arc with a swirling curtain of gas. To this end, the insulator body 16 includes a shielding gas passage 72 which extends from the upper end face 34 axially into the insulator body, and then angles outwardly and extends through the cylindrical outer surface of the insulator body. A nozzle retaining cup assembly 74 surrounds the insulator body 16 to create a generally annular shielding gas chamber 76 between the insulator body 16 and the nozzle retaining cup assembly 74. Shielding gas is supplied through the shielding gas passage 72 of the insulator body 16 into the shielding gas chamber 76.

The nozzle retaining cup assembly 74 includes a nozzle retaining cup holder 78 and a nozzle retaining cup 80 which is secured within the holder 78 by a snap ring 81 or the like. The nozzle retaining cup holder 78 is a generally cylindrical sleeve, preferably formed of metal, which is threaded over the lower end of a torch outer housing 82 which surrounds the main torch body 14. Insulation 84 is interposed between the outer housing 82 and the main torch body 14. The nozzle retaining cup 80 preferably is formed of plastic and has a generally cylindrical upper portion that is secured within the cup holder 78 by the snap ring 81 and a generally frustoconical lower portion which extends toward the end of the torch and includes an inwardly directed flange 86. The flange 86 confronts an outwardly directed flange 88 on the upper nozzle member 42 and contacts an O-ring 90 disposed therebetween. Thus, in threading the nozzle retaining cup assembly 74 onto the outer housing 82, the nozzle retaining cup 80 draws the nozzle assembly 22 upward into the metal insert sleeve 44 in the insulator body 16. As further described below in connection with FIGS. 4 and 5, the nozzle assembly 22 is thereby made to contact an electrical contact ring secured within the counterbore 38 of the insulator body 16.

The nozzle retaining cup 80 fits loosely within the cup holder 78, and includes longitudinal grooves 92 in its outer surface for the passage of shielding gas from the chamber 76 toward the end of the torch. Alternatively or additionally, grooves (not shown) may be formed in the inner surface of the cup holder 78. A shielding gas nozzle 94 of generally frustoconical form concentrically surrounds and is spaced outwardly of the nozzle tip 48 and is held by a shield retainer 96 which is threaded over the lower end of the cup holder 78. A shielding gas flow path 98 thus extends from the longitudinal grooves 92 in retaining cup 80, between the shield retainer 96 and the retaining cup 80 and upper nozzle member 42, and between the shielding gas nozzle 94 and the plasma gas nozzle tip 48.

The shielding gas nozzle 94 includes a diffuser 100 which in known manner imparts a swirl to the shielding gas flowing into the flow path between the shielding gas nozzle 94 and the nozzle tip 48. Thus, a swirling curtain of shielding gas is created surrounding the jet of plasma gas and the arc emanating from the nozzle exit orifice 50.

The torch 10 includes features providing improved sealing of the fluid connections between the main torch body 14 and the insulator body 16 so as to reduce the likelihood of liquid such as coolant wetting the adjoining surfaces of these bodies and finding its way to a part at nozzle potential such as the nozzle retaining cup holder 78, thereby establishing a current leakage path from the main torch body at electrode potential to the cup holder 78, which can make starting the torch difficult. To this end, a connector assembly fluidly couples the plasma gas passage 26 of main torch body 14 to the plasma gas passage 36 of the insulator body 16 and includes a coupling tube 102 having one end portion inserted into the passage 26 and the other end portion inserted into the passage 36. Each end portion includes a resilient compressible seal encircling the coupling tube. In the preferred embodiment of the invention shown in FIG. 1, each seal comprises a gland seal having a pair of O-rings 104 which are spaced apart along the coupling tube 102 and retained in grooves formed therein. The O-rings 104 are compressed between the coupling tube 102 and the inner surfaces of the passages 26 and 36. When the coupling tube 102 is inserted into each of the passages, air tends to be trapped between the O-rings 104 of each seal, thus creating an insulating air space.

Each of the passages 26 and 36 includes a receiving portion into which the coupling tube 102 is inserted, comprising a generally cylindrical passage having a tapered or flared entrance portion 105. The flared entrance portion 105 facilitates inserting the coupling tube 102 and O-rings 104 into the receiving portion of the passage.

The torch also includes an O-ring 106 disposed between the outer surface of the insulator body 16 and the inner surface of the insulating member 84 to prevent liquid from migrating therebetween and into contact with the cup holder 78. The invention thus eliminates the "face seals" of prior plasma arc torches, in which the abutting faces of the main torch body and insulator body compress O-rings retained in recesses in one or both of the faces. Such face seals can allow liquid to wet the adjoining faces, particularly when the insulator body is disassembled from the main torch body and then reassembled, such as during repair and maintenance of the torch. In addition, the O-rings of the face seals are easy to inadvertently dislodge from their desired positions, thus preventing a proper seal. With the gland seals of the present invention, the O-rings are held in place in grooves by their own elasticity and are not prone to being inadvertently dislodged.

The invention also includes features for lengthening the potential electrical path from the main torch body 14 through the shielding gas to the nozzle retaining cup holder 78. To this end, an elongate insulating conduit 108 is disposed within the shielding gas passage 72 of the insulator body 16, and extends through the shielding gas passage 32 in the main torch body 14 and into the shielding gas connector tube 30 through which shielding gas is supplied to the torch. The portions of the conduit 108 residing within the passages 32 and 72 are sealed by resilient compressible seals to prevent shielding gas from passing between the inner walls of the passages and the conduit. In the preferred embodiment illustrated in FIG. 1, the seals comprise pairs of spaced-apart O-rings 110 retained in grooves in the outer surface of the conduit 108 and compressed between the conduit and the inner walls of the passages. The conduit 108 thus prevents an electrical leakage path from being established over the relatively short length between the lower end of the main torch body 14 and the cup holder 78. Instead, the potential leakage path is between the shielding gas connector tube 30 at the upper end of the conduit 108, through the passages 32 and 72, and to the cup holder 78. Substantially lengthening the path in this manner results in substantially increasing the total resistance of the path, thus reducing the likelihood of current leaking through the shielding gas during starting of the torch.

Figure 3:
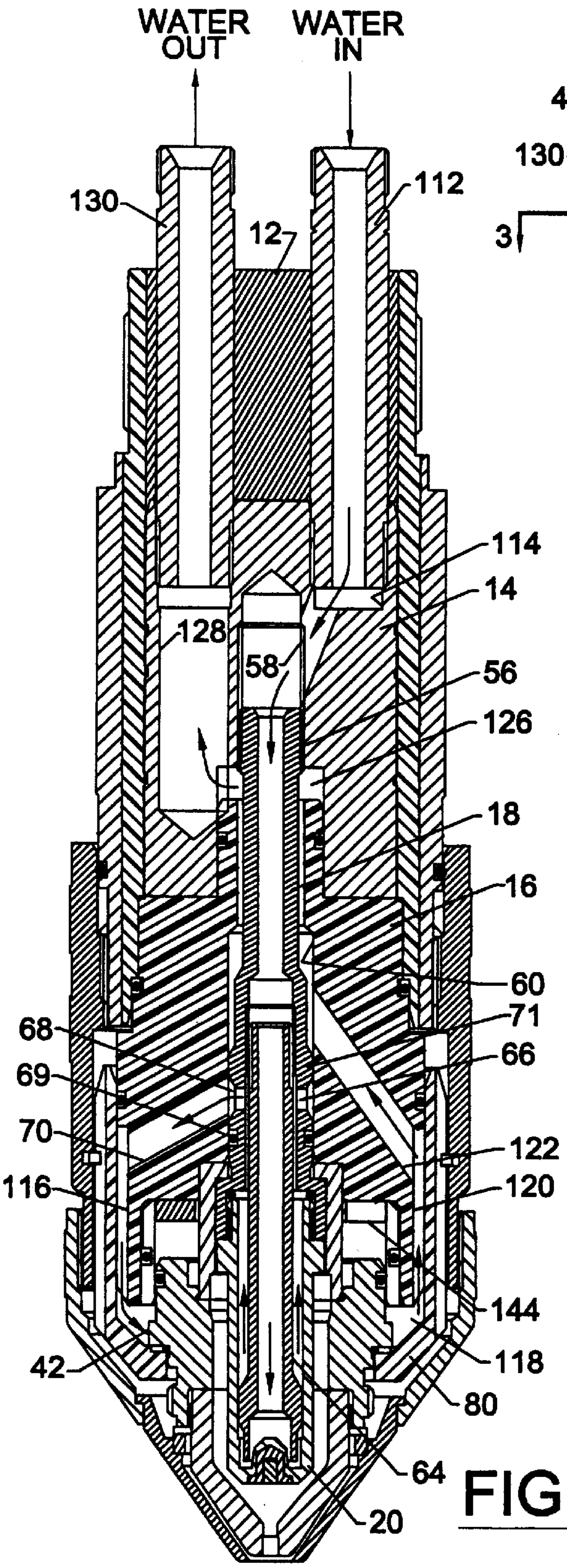
FIG. 3 is a sectioned side elevational view of the torch taken on the plane 3—3 of FIG. 1.

With primary reference to FIG. 3, the coolant circuits for cooling the electrode 20 and nozzle assembly 22 are now described. The torch 10 includes a coolant inlet connector tube 112 which extends through the rear insulator body 12 and is secured within a coolant inlet passage 114 in the main torch body 14. The coolant inlet passage 114 connects to the center axial bore 58 in the main torch body. Coolant is thus supplied into the bore 58 and thence into the internal passage through the electrode holder 56, through the internal passage of the coolant tube 64, and into the space between the tube 64 and the electrode 20. Heat is transferred to the liquid coolant from the lower end of the electrode (from which the arc emanates) and the liquid then flows through a passage between the lower end of the coolant tube 64 and the electrode 20 and upwardly through the annular space between the coolant tube 64 and the electrode 20, and then into the annular space between the coolant tube 64 and the electrode holder 18.

The coolant then flows but through the holes 66 into the space 68 and into the passage 70 through the insulator body 16. The seal 69 prevents the coolant in the space 68 from flowing toward the coupler 62 at the lower end of the holder 56, and the dam 71 substantially prevents coolant from flowing past the dam 71 in the other direction, although there is not a positive seal between the dam 71 and the inner wall of the bore 60. Thus, the coolant in space 68 is largely constrained to flow into the passage 70. The insulator body 16 includes a groove or flattened portion 116 which permits coolant to flow from the passage 70 between the insulator body 16 and the nozzle retaining cup 80 and into a coolant chamber 118 which surrounds the upper nozzle member 42. The coolant flows around the upper nozzle member 42 to cool the nozzle assembly.

Coolant is returned from the nozzle assembly via a second groove or flattened portion 120 angularly displaced from the portion 116, and into a coolant return passage 122 in the insulator body 16. The coolant return passage 122 extends into a portion of the axial bore 60 which is separated from the coolant supply passage 70 by the dam 71. The coolant then flows between the electrode holder 56 and the inner wall of the bore 60 and the bore 58 in the main torch body 14 into an annular space 126 which is connected with a coolant return passage 128 formed in the main torch body 14, and out the coolant return passage 128 via a coolant return connector tube 130 secured therein. Typically, returned coolant is recirculated in a closed loop back to the torch after being cooled.

Figure 4:
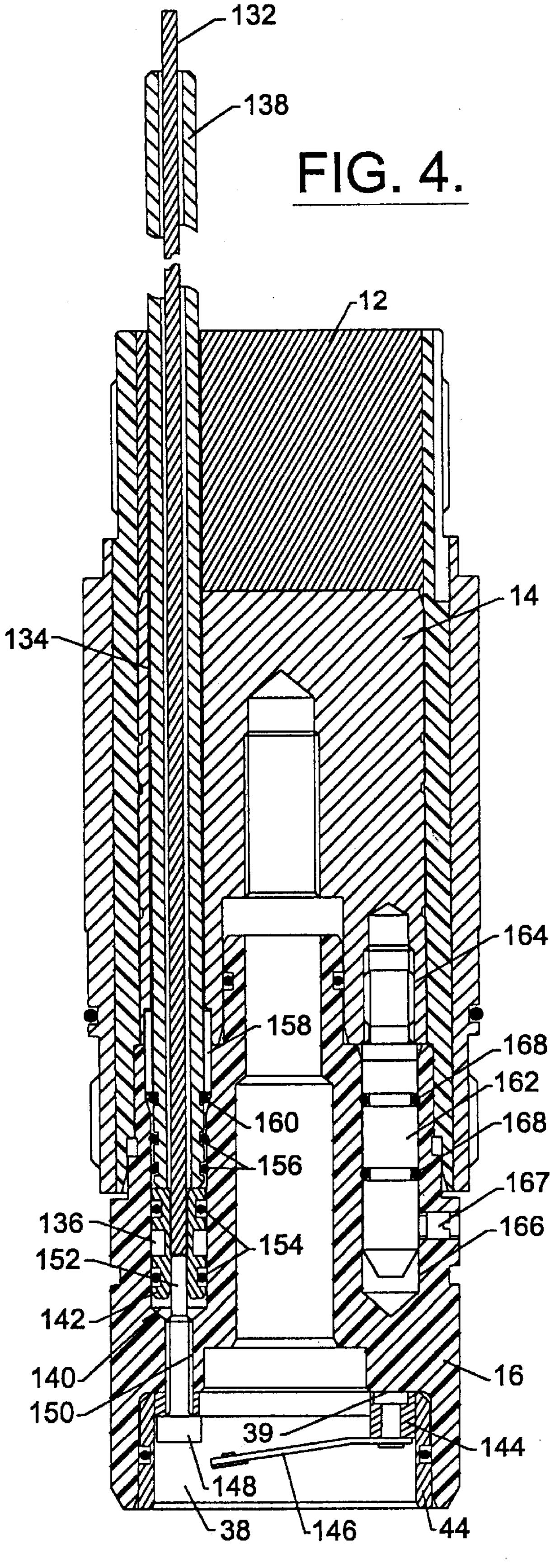
FIG. 4 is a cross-sectional view of a subassembly of the torch of FIG. 1 not including the nozzle assembly and associated nozzle retaining parts, taken along the plane 4—4 of FIG. 1.
Figure 5:
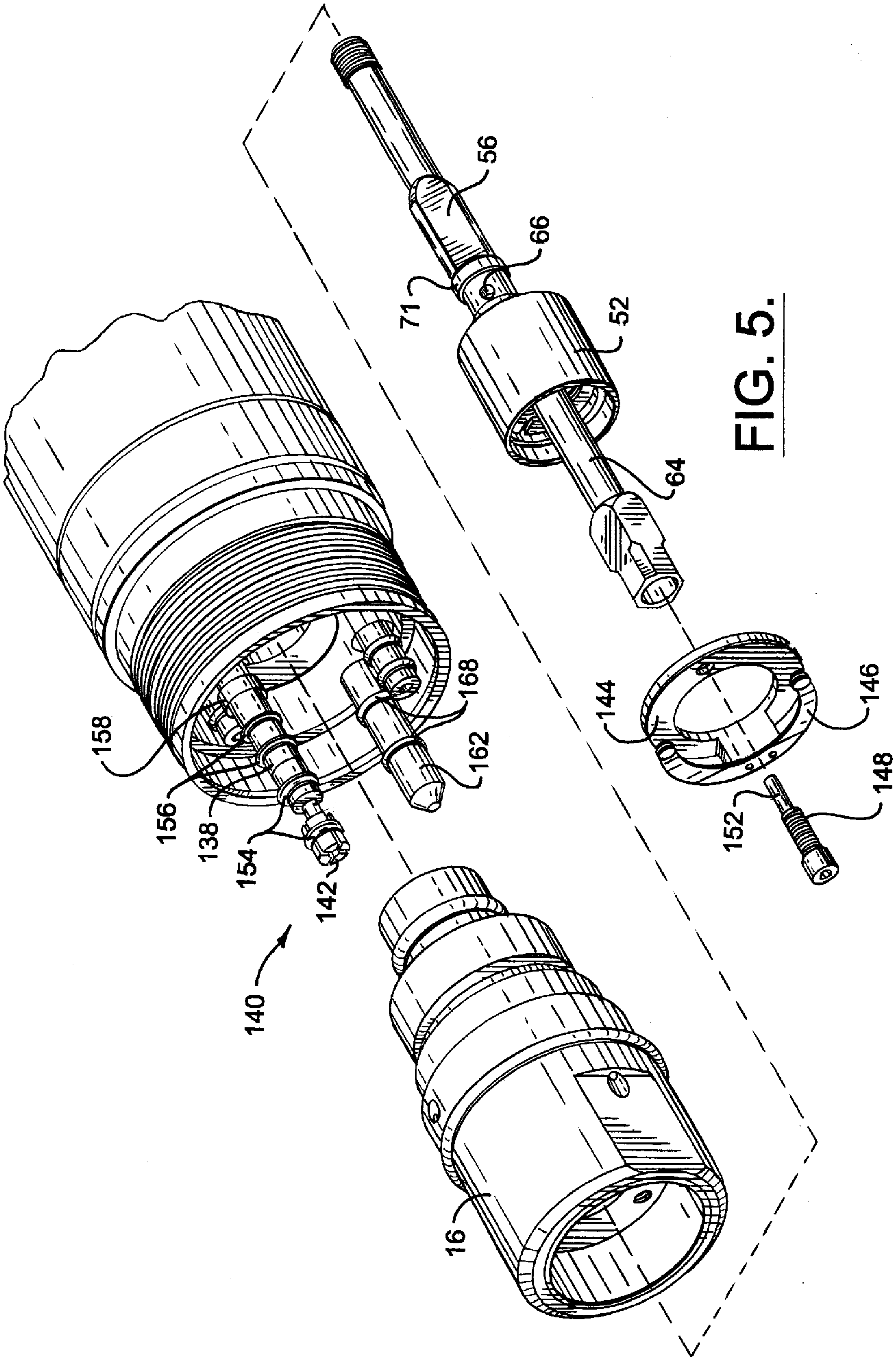
FIG. 5 is an exploded perspective view of the subassembly of FIG. 4.

The invention also provides an improved means for making an electrical connection between a conductor wire and the nozzle assembly during starting of the torch. With reference to FIGS. 4 and 5, a pilot arc bus wire or conductor 132 extends through a conductor passage 134 in the main torch body 14 and into a conductor receptacle 136 in the insulator body 16. The conductor 132 is surrounded by an insulating sleeve 138 which extends through the conductor passage 134 and partially into the receptacle 136, such that a free end of the conductor extends out from the lower end of the sleeve 138. An electrical connector assembly 140 is attached to the free end of the conductor 132, and includes an electrical connector 142 which is generally cylindrical and has an axial hole therethrough. The end of the conductor 132 is affixed within the upper end of the hole, such as by soft soldering. The lower end of the connector 142 preferably is split lengthwise. The connector 142 advantageously is larger in diameter than the inner diameter of the sleeve 138, so that the connector cannot be pushed into the sleeve.

An electrical contact member in the form of a contact ring 144 abuts the lower face 39 of the counterbore 38 in the insulator body 16. The contact ring 144 includes a resilient semi-circular contact spring 146 adapted to be contacted by the upper nozzle member 42 (FIG. 1) for making electrical connection therewith. A contact screw or fastener 148 extends through a hole in the contact ring 144 into an internally threaded access hole 150 which extends into the receptacle 136 in the insulator body 16. The end portion of the fastener 148 comprises a post 152 which is adapted to be inserted into the axial hole at the split end of the electrical connector 142 and spread the split end apart by a slight amount.

The electrical connector 142 preferably fits snugly into the receptacle 136 in the insulator body so that the spreading apart of the split end of the connector is resisted by the inner walls of the receptacle, thus facilitating a good electrical connection between the connector and the fastener 148. To this end, the connector 142 preferably includes a pair of O-rings 154 spaced apart along the connector and retained in grooves in the outer surface of the connector. The lower O-ring 154 surrounds the split portion of the connector 142. The lower O-ring 154 contacts the inner wall of the receptacle 136 and creates a circumferential tensile resiliency to provide a force resisting the spreading apart of the split end of the connector. The upper O-ring 154 comprises a resilient compressible seal for preventing gas from escaping upward through the receptacle 136 and through the internal passage of the insulating sleeve 138.

The torch also includes features for preventing the sleeve 138 from being pushed into the conductor passage 134 of the main torch body 14 far enough to make the electrical connector 142 inaccessible to the contact screw 148. Additionally, the torch has features for sealing the interface between the sleeve 138 and the receptacle 136 so as to prevent liquid from migrating therebetween and into contact with the electrical connector 142. To these ends, the torch includes a resilient compressible seal encircling the sleeve 138 and comprising a pair of O-rings 156 spaced apart along the sleeve and retained in grooves formed therein. The O-rings 156 are compressed between the sleeve 138 and the inner wall of the receptacle 136.

For preventing the sleeve 138 from being pushed into the conductor passage 134, a collar 158 is slidingly received over the sleeve between the O-rings 156 and the main torch body 14. The collar 158 is received in an annular recess surrounding the conductor passage 134, which prevents the collar from being pushed into the passage 134. A stop ring, preferably in the form of an O-ring 160 retained in a groove in the sleeve 138, is affixed to the sleeve between the O-rings 156 and the collar 158. Thus, the collar 158 and stop ring 160 cooperate to prevent the sleeve 138 from being pushed into the conductor passage 134 far enough to make the electrical connector 142 inaccessible to the contact screw 148. Making the stop ring in the form of a removable O-ring 160 facilitates assembly and disassembly of the torch.

For facilitating the assembly of the insulator body 16 onto the lower end of the main torch body, the torch includes a locator pin 162 which is secured within a hole 164 in the main torch body 14 and projects outwardly therefrom. The insulator body 16 includes a hole 166 for receiving the locator pin 162. A set screw 167 extends through from an outer surface of the insulator body 16 into the hole 166 for engaging the locator pin 162 to prevent the insulator body from being inadvertently separated from the main torch body during assembly. The locator pin 162 is formed of an electrically insulating material.

Figure 6:
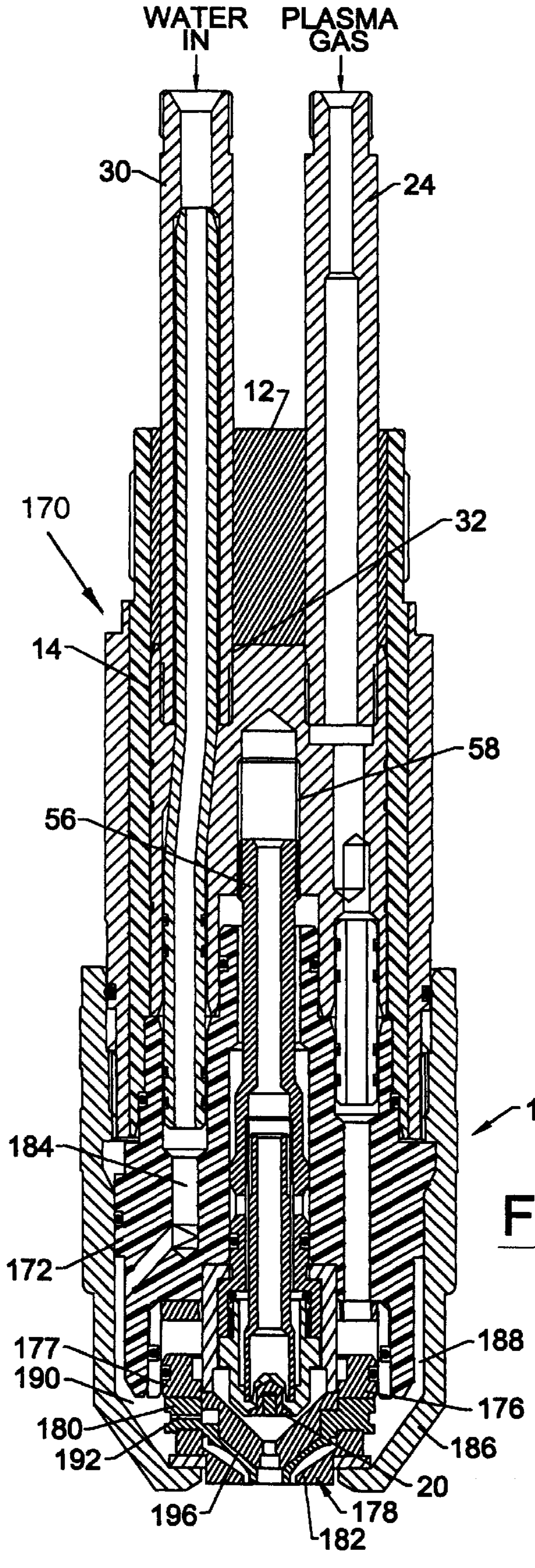
FIG. 6 is a sectioned side elevational view similar to FIG. 1, showing a water-injection torch in accordance with another preferred embodiment of the invention.
Figure 7:
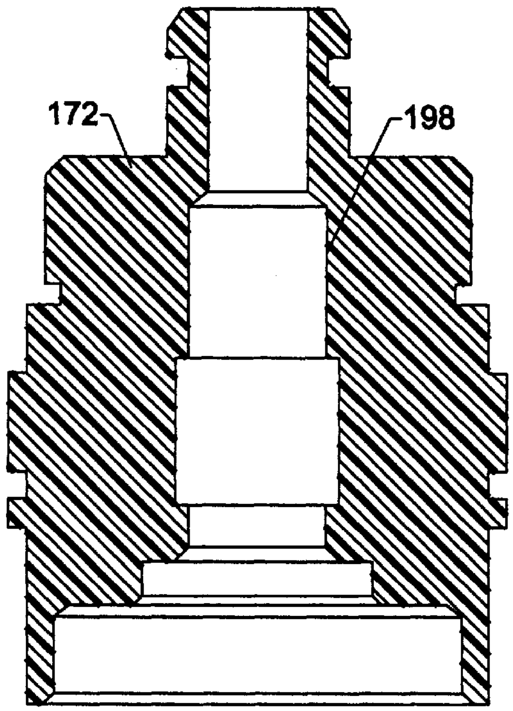
FIG. 7 is a cross-sectional view showing the insulator body of the water-injection torch of FIG. 6, taken on a plane similar to that of FIG. 3.

The invention also provides a plasma arc torch which is readily convertible between a shielding gas torch and a water-injection torch. A preferred embodiment of a water-injection plasma arc torch is shown in FIGS. 6 and 7. The water-injection torch 170 is similar in many respects to the shielding gas torch 10 described above, and accordingly the following description focuses on those aspects of the water-injection torch 170 which are peculiar to it. Parts that are common between the two torches 10 and 170 are denoted with the same reference numbers.

The shielding gas torch 10 may be readily converted to the water-injection torch 170. First, the insulator body 16 is replaced with a modified insulator body 172. The nozzle retaining cup assembly 74 is replaced by a modified nozzle retaining cup 174, and the plasma nozzle assembly 22 is replaced by a modified plasma nozzle 176. The shielding gas nozzle 94 is replaced by a water-injection nozzle assembly 178.

The water-injection nozzle assembly 178 includes an upper nozzle member 180 and a nozzle insulator 182. The plasma nozzle 176 includes an annular ring or flange 177 which seats within the insulator body 172, and the upper nozzle member 180 abuts against the flange 177. The nozzle insulator 182 abuts against the upper nozzle member 180 and the nozzle retaining cup 174 engages the nozzle insulator 182 to retain the nozzle 174 and water-injection nozzle assembly 178 in place.

Water is supplied to the torch via an injection water connector tube 30 (the same tube used for supplying shielding gas to the torch 10) which is secured within an injection water passage 32 in the main torch body 14. The passage 32 connects with an injection water passage 184 in the insulator body 172, the passage 184 extending through the outer cylindrical surface of the insulator body. The nozzle retaining cup 174 surrounds the insulator body 172 and comprises a unitary structure having a lower generally frustoconical portion 186 which retains the water-injection nozzle assembly 176. A water-injection flow path 188 extends between the insulator body 172 and the nozzle retaining cup 174, into a water-injection chamber 190 which surrounds the upper nozzle member 180 and the nozzle insulator 182. The upper nozzle member 180 includes passages 192 which direct injection water from the chamber 190 into the annular water-injection nozzle flowpath 196 between the upper nozzle member 180 and the plasma nozzle 176, and the water then flows out through the discharge opening at the tip of the nozzle.

As shown in FIG. 7, the insulator body 172 does not include coolant supply and return passages for circulating coolant around the nozzle assembly 176, because the nozzle assembly 176 is cooled by the injection water. Coolant supplied through the electrode holder 56 for cooling the electrode 20 is returned through the axial bore 198 in the insulator body 172, to the axial bore 58 in the main torch body 14, and out through the coolant return connector tube 130 (FIG. 3), as previously described for the torch 10.

In use, and with reference to FIG. 1, one side of an electrical potential source 210, typically the cathode side, is connected to the main torch body 12 and thus is connected electrically with the electrode 20, and the other side, typically the anode side, of the source 210 is connected to the nozzle assembly 22 through a switch 212 and a resistor 214. The anode side is also connected in parallel to the workpiece 216 with no resistor interposed therebetween. A high voltage and high frequency are imposed across-the electrode and nozzle assembly, causing an electric arc to be established across a gap therebetween adjacent the plasma gas nozzle discharge. Plasma gas is flowed through the plasma gas nozzle to blow the pilot arc outward through the nozzle discharge until the arc attaches to the workpiece. The switch 212 connecting the potential source to the nozzle assembly is then opened, and the torch is in the transferred arc mode for performing a work operation on the workpiece. The power supplied to the torch is increased in the transferred arc mode to create a cutting arc which is of a higher current (and typically a lower voltage) than the pilot arc.

From the foregoing description of certain preferred embodiments of the invention, it will be appreciated that the invention provides a plasma arc torch having unique means for sealing connections between fluid passages of adjoining parts of the torch. The torch also has unique means for lengthening the potential electrical path through a control fluid such as shielding gas or injection water, from a main torch body at electrode potential to a part of the torch at nozzle potential during starting of the torch. The invention thus facilitates a reduction in current leakage during starting of the torch. The invention also provides a unique pilot arc electrical assembly which makes assembly of the torch easier. Additionally, the invention facilitates conversion of a gas-shielded torch to a water-injection torch with minimal change of parts.

Modifications may be made to the embodiments described herein, including modifications of and/or substitution of equivalents for one or more of the elements which have been illustrated and described, without departing from the scope of the invention as defined in the appended claims.

What is claimed is:

1. A plasma arc torch assembly facilitating commonality of components between a gas-shielded torch and a water-injection torch, and comprising:

a main torch body having first and second end faces, a control fluid passage and a plasma gas passage each extending from the first end face through the main torch body and out the second end face, the control fluid passage being adapted to carry a control fluid comprising one of a shielding gas and injection water;

a shielding gas insulator body having opposite first and second ends and a shielding gas passage and a plasma gas passage each extending from the first end through the insulator body, the first end of the shielding gas insulator body being structured to be received against the second end of the main torch body, and the shielding gas and plasma gas passages being alignable with the control fluid and plasma gas passages, respectively, of the main torch body;

a water-injection insulator body having opposite first and second ends and an injection water passage and a plasma gas passage each extending from the first end through the water-injection insulator body, the first end of the water-injection insulator body also being structured to be received against the second end of the main torch body, and the injection water and plasma gas passages being alignable with the control fluid and plasma gas passages, respectively, of the main torch body; and an electrode having a discharge end operable to support an electric arc extending therefrom to a workpiece;

the main torch body being assemblable with either of the shielding gas and water-injection insulator bodies such that plasma gas is passed from the main torch body through the insulator body assembled thereto for supplying the plasma gas to a plasma nozzle and the control fluid is passed from the main torch body through the insulator body assembled thereto for supplying the control fluid to a control fluid nozzle.

2. The plasma arc torch assembly of claim 1, further comprising a generally cylindrical outer housing surrounding the main torch body and having an open end extending beyond the second end face of the main torch body so as to define an opening for receiving the first end of one of the insulator bodies therein.

3. The plasma arc torch assembly of claim 1, further comprising a shielding gas nozzle adapted to be juxtaposed with the second end of the shielding gas insulator body for receiving shielding gas from the shielding gas passage thereof, the shielding gas nozzle being adapted to direct a stream of shielding gas to surround the stream of plasma gas and the arc.

4. The plasma arc torch assembly of claim 1, further comprising a water-injection nozzle adapted to be juxtaposed with the second end of the water-injection insulator body for receiving injection water from the injection water passage thereof, the water-injection nozzle being adapted to direct a stream of injection water to surround the stream of plasma gas and the arc.

5. The plasma arc torch assembly of claim 1 wherein each of the insulator bodies includes an axial bore therethrough for containing the electrode.

6. The plasma arc torch assembly of claim 5, wherein the shielding gas insulator body includes a coolant supply passage extending from a first portion of the axial bore to an outer surface of the insulator body for supplying coolant to cool the nozzle, and a coolant return passage extending from the outer surface to a second portion of the axial bore from which the coolant is returned through the main torch body.

7. The plasma arc torch assembly of claim 5, wherein the main torch body defines an axial bore therethrough, and wherein the electrode is retained by a tubular electrode holder having an internal passage adapted to carry coolant and having a first tubular portion adapted to be secured within the axial bore through the main torch body and a second tubular portion forming an extension of the first portion and adapted to be received within the axial bore of either of the insulator bodies when assembled to the main torch body, the second portion terminating at a free end adapted to removably retain the electrode, the second portion further including at least one coolant hole through a side wall thereof, a seal on the outer surface of the second portion located between the coolant hole and the free end and adapted to seal against an inner wall of the bore in either of the insulator bodies, and a dam on the outer surface located between the hole and the first portion of the electrode holder and adapted to cooperate with the inner wall of the bore in either of the insulator bodies to substantially prevent fluid from flowing past the dam.

8. The plasma arc torch assembly of claim 1, wherein each of the insulator bodies comprises a solid generally cylindrical body of electrically insulating material, the body having an end face at the first end thereof and a bore extending through the body from the end face for receiving the electrode, the body further including a fluid passage extending through the body from the end face, the fluid passage including a receiving portion for receiving a fluid connector, the receiving portion being generally cylindrical and including a flared entrance portion adjacent the end face at the first end of the body to facilitate inserting the fluid connector into the receiving portion.

9. The plasma arc torch assembly of claim 8 wherein the receiving portion of the fluid passage includes inner surfaces defining a stop for a fluid connector to abut when inserted into the receiving portion.

10. The plasma arc torch assembly of claim 8 wherein the fluid passage comprises a plasma gas passage, and further including a control fluid passage originating at the end face and having a receiving portion with a flared entrance portion adapted to receive a fluid connector.

11. The plasma arc torch assembly of claim 8, wherein the shielding gas insulator body further includes a coolant supply passage extending from a first portion of the bore through the outer cylindrical surface of the insulator body for supplying a coolant to a plenum surrounding the nozzle, and a coolant return passage extending from the outer cylindrical surface of the insulator body into a second portion of the bore between the first portion of the bore and the first end of the insulator body for returning coolant through the bore to the main torch body.

12. A plasma arc torch comprising:

an electrically conductive main torch body having a fluid passage extending through an end face thereof;

an insulator body having an end face and a fluid passage originating thereat, the insulator body being connected to the main torch body with the end face of the insulator body confronting the end face of the main torch body and the fluid passages generally aligned;

an electrode projecting from an outer end of the insulator body;

a nozzle supported by and electrically insulated from the main torch body by the insulator body, and arranged to permit an electric arc to be established across a gap defined between the electrode and the nozzle; and a connector in the form of a tube of electrically insulating material for fluidly coupling the fluid passage of the main torch body to the fluid passage of the insulator body, the connector having a first portion slidably inserted into and sealingly received within the fluid passage of the main torch body and a second portion slidably inserted into and sealingly received within the fluid passage of the insulator body.

13. The plasma arc torch of claim 12 wherein the connector comprises a coupling tube having a resilient compressible seal encircling the first portion and a resilient compressible seal encircling the second portion, the seals being compressed between the outer wall of the coupling tube and inner walls of the fluid passages of the main torch body and insulator body for establishing a sealing connection between said passages.

14. The plasma arc torch of claim 13 wherein the resilient compressible seals comprise O-rings retained in grooves formed in the outer surface of the coupling tube.

15. The plasma arc torch of claim 14 wherein each of the first and second portions of the coupling tube has a pair of O-rings spaced apart lengthwise along the coupling tube.

16. The plasma arc torch of claim 12 wherein the fluid passages of the main torch body and insulator body comprise passages for supplying a plasma gas to the nozzle, and wherein the main torch body further includes a control fluid passage and the insulator body further includes a control fluid passage for supplying a control fluid to the nozzle, and further including a connector comprising a coupling tube having a first portion sealingly received within the control fluid passage of the main torch body and a second portion sealingly received within the control fluid passage of the insulator body.

17. The plasma arc torch of claim 16 wherein the control fluid passages comprise shielding gas passages for supplying a shielding gas to the nozzle, and wherein the nozzle comprises a nozzle assembly including a plasma gas nozzle which receives a plasma gas from the plasma gas passage of the insulator body and a shielding gas nozzle which surrounds the plasma gas nozzle and receives a shielding gas from the shielding gas passage of the insulator body.

18. An insulator body assembly for a plasma arc torch of the type including a main torch body having a fluid passage extending through an end face of the main torch body for passing a fluid through the main torch body to the insulator body, and comprising:

an insulator body having an end face and a fluid passage originating thereat, the insulator body being adapted to be connected to the main torch body with the respective end faces in confronting relation and the fluid passages generally aligned; and a connector in the form of a tube of electrically insulating material for fluidly coupling the fluid passage of the main torch body to the fluid passage of the insulator body, the connector having a first end adapted to be slidably and sealingly received within the fluid passage of the main torch body and a second end adapted to be slidably and sealingly received within the fluid passage of the insulator body.

19. The insulator body assembly of claim 18 wherein the connector comprises a coupling tube having at least one resilient compressible seal encircling the first portion and at least one resilient compressible seal encircling the second portion, the seals being adapted to be compressed between the outer wall of the coupling tube and inner walls of the fluid passages of the main torch body and insulator body for establishing a sealing connection between said passages.

20. The insulator body assembly of claim 19 wherein the resilient compressible seals comprise O-rings retained in grooves formed in the outer surface of the coupling tube.

21. The insulator body assembly of claim 20 wherein each of the first and second portions of the coupling tube has a pair of O-rings spaced apart lengthwise along the coupling tube.

22. The insulator body assembly of claim 21 wherein the coupling tube is plastic.

23. A plasma arc torch comprising:

an electrically conductive main torch body having a control fluid passage adapted to receive a control fluid from a source, the control fluid passage extending through an end face of the main torch body, and an elongate control fluid connector tube projecting from an opposite end of the main torch body, the control fluid connector tube being connected to the control fluid passage in the main torch body for supplying control fluid thereinto;

an insulator body having an end face confronting the end face of the main torch body and an electrically conductive control fluid nozzle supported at an outer end of the insulator body and insulated from the main torch body by the insulator body, the insulator body having a control fluid passage generally aligned with the control fluid passage of the main torch body for supplying control fluid to the control fluid nozzle; and an elongate electrically insulating conduit having a first portion sealingly received within the control fluid passage of the main torch body and extending into the control fluid connector tube and a second portion sealingly received within the control fluid passage of the insulator body.

24. The plasma arc torch of claim 23, further comprising a generally tubular outer housing surrounding the main torch body, and a nozzle retainer connected to the outer housing and surrounding the insulator body and the control fluid nozzle, the control fluid passage of the insulator body extending through the outer surface of the insulator body into an annular passage defined between the insulator body and the nozzle retainer, the annular passage being coupled with the control fluid nozzle, the electrically insulating conduit serving to lengthen the electrical path from the main torch body through the control fluid to the nozzle retainer.

25. The plasma arc torch of claim 24 wherein each of the first and second portions of the conduit includes a resilient compressible seal adapted to be compressed between the outer wall of the conduit and inner surfaces of the control fluid passages of the main torch body and insulator body for sealing the connection between said passages.

26. The plasma arc torch of claim 25 wherein each of the compressible seals comprises an O-ring retained in a circumferential groove formed in the outer surface of the conduit.

27. The plasma arc torch of claim 25 wherein each of the resilient compressible seals comprises a pair of O-rings spaced apart lengthwise along the conduit and retained in spaced-apart circumferential grooves in the outer surface of the conduit.

28. The plasma arc torch of claim 24 wherein the torch further comprises a primary nozzle and the control fluid passages comprise shielding gas passages for supplying a shielding gas to the control fluid nozzle, and wherein the control fluid nozzle comprises a shielding gas nozzle which surrounds the primary nozzle and directs a shielding gas to surround an arc which extends out of the primary nozzle to a workpiece during operation of the plasma arc torch.

29. A main torch body assembly for a plasma arc torch of the type including a torch end assembly having an insulator body with an end face thereof confronting the main torch body assembly and an electrically conductive control fluid nozzle supported at an outer end of the insulator body and insulated from the main torch body assembly by the insulator body, the insulator body having a control fluid passage originating at the end face thereof for supplying control fluid to the control fluid nozzle, the main torch body assembly comprising:

an electrically conductive main torch body having a control fluid passage extending therethrough to a first end of the main torch body and adapted to be aligned with a corresponding passage of an insulator body, and an elongate control fluid connector tube projecting from an opposite second end of the main torch body, the control fluid connector tube being connected to the control fluid passage in the main torch body for supplying control fluid thereinto; and an elongate electrically insulating conduit having a first portion sealingly received within the control fluid passage of the main torch body and extending into the control fluid connector tube and a second portion adapted to be sealingly received within the control fluid passage of the insulator body.

30. The main torch body assembly of claim 29 wherein the first and second portions of the conduit each includes a resilient compressible seal adapted to be compressed between the outer wall of the conduit and inner surfaces of the control fluid passages of the main torch body and insulator body for sealing the connection between said passages.

31. The main torch body assembly of claim 30 wherein each of the compressible seals comprises an O-ring retained in a circumferential groove formed in the outer surface of the conduit.

32. The main torch body assembly of claim 30 wherein each of the resilient compressible seals comprises a pair of O-rings spaced apart lengthwise along the conduit and retained in spaced-apart circumferential grooves in the outer surface of the conduit.

33. A plasma arc torch comprising:

an electrically conductive main torch body having an elongate control fluid connector tube projecting from a first end thereof and a control fluid passage adapted to receive a control fluid from the connector tube, and a plasma gas passage for receiving plasma gas from a source, the control fluid passage and plasma gas passage extending through an end face of the main torch body at a second end thereof;

a torch end assembly connected to the main torch body and including an insulator body having a first end confronting the end face of the main torch body and an electrically conductive nozzle assembly supported at a second end of the insulator body and insulated from the main torch body by the insulator body, the nozzle assembly including a plasma gas nozzle and a control fluid nozzle coaxial with the plasma gas nozzle, and the insulator body having a control fluid passage generally aligned with the control fluid passage of the main torch body for supplying control fluid to the control fluid nozzle and a plasma gas passage generally aligned with the plasma gas passage of the main torch body for supplying plasma gas to the plasma gas nozzle;

an elongate electrically insulating conduit having a first portion sealingly received within the control fluid passage of the main torch body and extending into the control fluid connector tube and a second portion sealingly received within the control fluid passage of the insulator body; and a connector in the form of a tube of electrically insulating material for fluidly coupling the plasma gas passage of the main torch body with the plasma gas passage of the insulator body, the connector having a first portion sealingly received within the plasma gas passage of the main torch body and a second portion sealingly received within the plasma gas passage of the insulator body.

34. The plasma arc torch of claim 33 wherein each of the first and second portions of the insulating conduit includes a resilient compressible seal encircling the conduit and adapted to be compressed between the conduit and the inner surfaces of the control fluid passages of the main torch body and insulator body, and each of the first and second portions of the connector includes a resilient compressible seal encircling the connector and adapted to be compressed between the connector and the inner surfaces of the plasma gas passages of the main torch body and insulator body.

35. The plasma arc torch of claim 34 wherein each of the resilient compressible seals comprises a gland seal.

* * * * *

UNITED STATES PATENT AND TRADEMARK OFFICE

CERTIFICATE OF CORRECTION

PATENT NO. : 6,215,090 B1
DATED : April 10, 2001
INVENTOR(S) : Severance Jr. et al.

It is certified that error appears in the above-identified patent and that said Letters Patent is hereby corrected as shown below:

Title page,
Item [56] References Cited, U.S. PATENT DOCUMENTS, insert the following:

-- 4,967,055 10/1990 Raney et al. --.

Signed and Sealed this

Fifth Day of February, 2002

*Attest:*

JAMES E. ROGAN
*Director of the United States Patent and Trademark Office*

*Attesting Officer*